US012777539B2

(12) United States Patent
Smith et al.

(10) Patent No.: US 12,777,539 B2
(45) Date of Patent: Oct. 27, 2026

(54) ACCESS POINT COORDINATION USING DUAL NETWORK ALLOCATION VECTORS

(71) Applicant: Cisco Technology, Inc., San Jose, CA (US)

(72) Inventors: Malcolm M. Smith, Richardson, TX (US); Indermeet S. Gandhi, San Jose, CA (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 18/589,310

(22) Filed: Feb. 27, 2024

(65) Prior Publication Data

US 2025/0212273 A1 Jun. 26, 2025

Related U.S. Application Data

(60) Provisional application No. 63/613,681, filed on Dec. 21, 2023.

(51) Int. Cl.
*H04W 76/15* (2018.01)
*H04W 48/20* (2009.01)

(52) U.S. Cl.
CPC ........... *H04W 76/15* (2018.02); *H04W 48/20* (2013.01)

(58) Field of Classification Search
CPC .............................. H04W 76/15; H04W 48/20
See application file for complete search history.

(56) References Cited

U.S. PATENT DOCUMENTS

| | | | | |
|---|---|---|---|---|
| 9,497,781 B2 * | 11/2016 | Jeffery | | H04W 74/0816 |
| 12,207,222 B2 * | 1/2025 | Zorgui | | H04W 48/16 |
| 12,317,220 B2 * | 5/2025 | El Ferkouss | | H04W 64/003 |
| 12,520,340 B2 * | 1/2026 | Lopez | | H04W 74/006 |
| 2021/0195494 A1 * | 6/2021 | Zhang | | H04W 36/0061 |
| 2023/0007684 A1 | 1/2023 | Guo et al. | | |
| 2023/0007708 A1 | 1/2023 | Sun et al. | | |
| 2023/0140312 A1 | 5/2023 | Ajami et al. | | |

(Continued)

FOREIGN PATENT DOCUMENTS

| | | |
|---|---|---|
| EP | 4383915 A1 | 6/2024 |
| WO | 2023013254 A1 | 2/2023 |

OTHER PUBLICATIONS

International Search Report and Written Opinion for International Application No. PCT/US2024/061498, mailed Mar. 12, 2025, 13 Pages.

(Continued)

*Primary Examiner* — Chandrahas B Patel
(74) *Attorney, Agent, or Firm* — Patterson + Sheridan, LLP

(57) ABSTRACT

The present disclosure describes a network that uses dual NAVs. An apparatus includes one or more memories and one or more processors communicatively coupled to the one or more memories. A combination of the one or more processors generates a message that includes (i) a first NAV indicating a first time period and (ii) a second NAV indicating a second time period and transmits the message. The first NAV indicates to a first access point assigned to an overlapping basic service set to defer transmissions during the first time period. The second NAV indicates to a second access point assigned to a MAPC group that transmissions are allowed during the second time period.

18 Claims, 8 Drawing Sheets

(56) References Cited

U.S. PATENT DOCUMENTS

| | | | |
|---|---|---|---|
| 2023/0308155 | A1 | 9/2023 | Kwon et al. |
| 2023/0413255 | A1 | 12/2023 | Naribole et al. |

OTHER PUBLICATIONS

Nunez D., et al., "Multi-AP Coordinated Spatial Reuse for Wi-Fi 8: Group Creation and Scheduling", 2023 21st Mediterranean Communication and Computer Networking Conference (MEDCOMNET), IEEE, Jun. 13, 2023, pp. 203-208, XP034372413, DOI: 10.1109/MEDCOMNET58619.2023.10168857, Retrieved on Jul. 7, 2023, p. 2, Lines 1-34, Paragraph III.

* cited by examiner

ACCESS POINT COORDINATION USING DUAL NETWORK ALLOCATION VECTORS

CROSS-REFERENCE TO RELATED APPLICATIONS

This application claims benefit of co-pending U.S. provisional patent application Ser. No. 63/613,681 filed Dec. 21, 2023. The aforementioned related patent application is herein incorporated by reference in its entirety.

TECHNICAL FIELD

Embodiments presented in this disclosure generally relate to wireless communication. More specifically, embodiments disclosed herein relate to access point coordination using dual network allocation vectors (NAVs).

BACKGROUND

Wireless networks (e.g., wireless fidelity (WiFi) networks) may use multi-access point coordination (MAPC) to improve spatial reuse efficiency. Access points in the networks are assigned to coordination groups (CGs), and then access points in a CG parallelize transmissions that would otherwise have to be scheduled serially. Existing networks use a NAV to indicate, to access points in the network, busy periods during which transmissions should be deferred. The NAV, however, may provide limited support for MAPC. For example, the NAV may cause access points in a CG to defer transmissions during a transmission opportunity (TXOP) for the CG.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
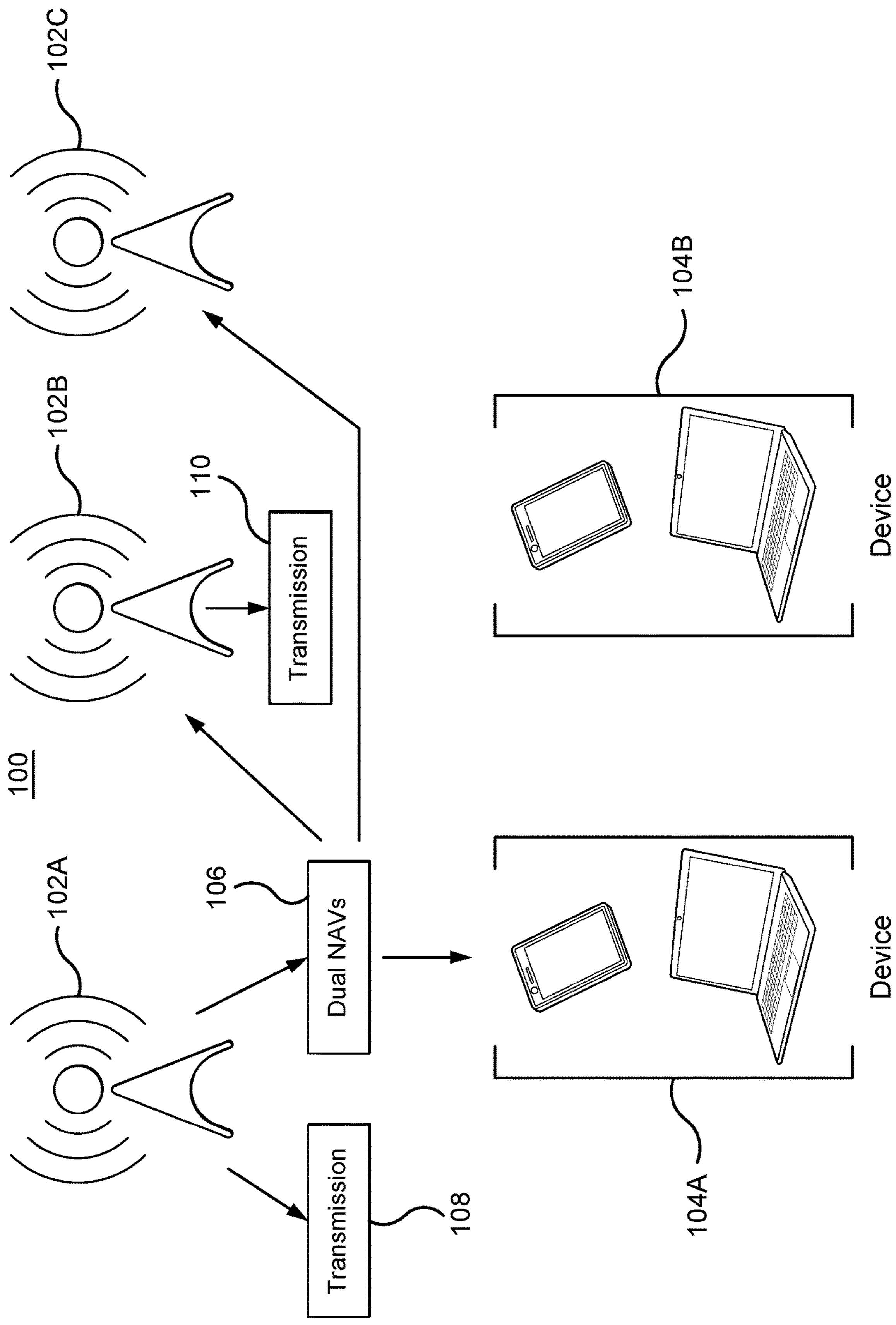
FIGS. 1A and 1B illustrate an example system.

The present disclosure describes a network that uses dual NAVs. According to an embodiment, an apparatus includes one or more memories and one or more processors communicatively coupled to the one or more memories. A combination of the one or more processors generates a message that includes (i) a first NAV indicating a first time period and (ii) a second NAV indicating a second time period and transmits the message. The first NAV indicates to a first access point assigned to an overlapping basic service set to defer transmissions during the first time period. The second NAV indicates to a second access point assigned to a MAPC group that transmissions are allowed during the second time period.

According to another embodiment, a method includes generating, by a first access point, a message that includes (i) a first NAV indicating a first time period and (ii) a second NAV indicating a second time period. The method also includes transmitting, by the first access point, the message. The first NAV indicates to a second access point assigned to an overlapping basic service set to defer transmissions during the first time period. The second NAV indicates to a third access point assigned to a MAPC group that transmissions are allowed during the second time period.

According to another embodiment, a system includes a first access point assigned to a MAPC group and a second access point assigned to the MAPC group. The second access point generates a message that includes (i) a first NAV indicating a first time period and (ii) a second NAV indicating a second time period. The second access point also transmits the message. The first NAV indicates to access points assigned to an overlapping basic service set to defer transmissions during the first time period. The second NAV indicates to the first access point that transmissions are allowed during the second time period.

Example Embodiments

The present disclosure describes a network (e.g., a WiFi network) that uses dual NAVs to coordinate transmissions from access points that are assigned to a CG and from access points that are outside the CG (e.g., access points that are part of an overlapping basic service set (OBSS)). An access point in the CG (e.g., a leader access point) may transmit a message (e.g., a CG setup frame) that includes two NAVs, referred to as an outer NAV and an inner NAV. The outer NAV indicates to access points in an OBSS a time period when transmissions should be deferred (similar operation to existing NAVs). The inner NAV indicates to access points in the CG a time period when transmissions are allowed. The time period when the access points in the OBSS defer transmissions may partially overlap with the time period when the access points in the CG are allowed to transmit. In this manner, the access points in the CG may parallelize transmissions during a TXOP for the CG, while the access points in the OBSS defer transmissions.

In particular embodiments, the network provides several technical advantages. For example, the network provides differentiated NAV durations for access points in the CG and access points in the OBSS. As another example, the network may provide conflict free transmission scheduling for access points in the CG.

FIG. 1A illustrates an example system 100, which may be a wireless network (e.g., a WiFi network). As seen in FIG. 1A, the system 100 includes one or more access points 102 (e.g., access points 102A, 102B, and 102C) and one or more devices 104 (e.g., devices 104A and 104B). Generally, the devices 104 connect to an access point 102. The access point 102 provides network coverage for the system 100. The access point 102 communicates messages to the devices 104 and directs messages from the devices 104 towards their destination.

The access point 102 facilitates wireless communication (e.g., WiFi communication) in the system 100. One or more devices 104 may connect to the access point 102. The access point 102 may then facilitate wireless communication for the connected devices 104. For example, the access point 102 may transmit messages to a connected device 104. As another example, the access point 102 may receive messages transmitted by the device 104. The access point 102 may then direct that message towards its intended destination.

The device 104 may be any suitable device that wirelessly connects to the access point 102. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user. The device 104 may include a hardware processor, memory, or circuitry configured to perform any of the functions or actions of the device 104 described herein. For example, a software application designed using software code may be stored in the memory and executed by the processor to perform the functions of the device 104.

The access points 102 may be assigned to CGs (which may also be referred to as MAPC groups). An access point 102 may be the leader of the CG and may coordinate the transmissions of the access points 102 in the CG. The access points 102 in the CG may improve spatial reuse efficiency by parallelizing their transmissions that would otherwise have to be scheduled serially. To reduce interference from access points 102 that are not in the CG, the leader access point 102 may transmit a message that includes dual NAVs. One of the NAVs, referred to as an outer NAV, may indicate a time period when access points 102 that are outside the CG (e.g., access points 102 in an OBSS) should defer transmissions. The other NAV, referred to as an inner NAV, may indicate a time period when access points 102 in the CG may transmit. The time periods indicated in the NAVs may partially overlap each other. In this manner, the access points 102 outside the CG are instructed when to defer transmissions, and the access points 102 in the CG are instructed when to transmit. Because the time periods indicated by the NAVs may partially overlap, the access points 102 outside the CG may defer transmissions to reduce interference when the access points 102 in the CG are transmitting.

The devices 104 that are associated with (e.g., connected to) the access points 102 in the CG may use the inner NAV to determine when the devices 104 should defer transmissions. The devices 104 that are associated with the access points 102 outside the CG may use the outer NAV to determine when the devices 104 should defer transmissions. For example, the devices 104 may receive the message containing the outer and inner NAVs from the leader access point 102 of the CG. The device 104 that is associated with an access point 102 in the CG may process the inner NAV to determine when to defer transmissions. The device 104 that is associated with an access point 102 outside the CG may process the outer NAV to determine when to defer transmissions.

In some embodiments, the devices 104 may signal to the access points 102 whether the devices 104 support or handle dual NAVs. For example, the devices 104 may use a subfield (e.g., a dual NAV mode subfield) in an element (e.g., the Extended Capabilities element) to indicate whether the devices 104 support the outer and inner NAVs. The devices 104 may set the subfield to a value (e.g., '1') to indicate that the devices 104 support outer and inner NAVs. The access points 102 in the CG may then signal the devices 104 that are associated with those access points 102 and that support outer and inner NAVs such that those devices 104 receive both the outer and inner NAVs. For example, the access points 102, including the leader access point 102 of the CG, may generate a message containing both the outer and inner NAVs in response to receiving the subfield or element from a device 104 indicating that the device 104 supports dual NAVs. The access points 102 may then transmit the message to the device 104.

The device 104 may also track which access points 102 in the system 100 belong to the CG and which access points 102 are outside the CG. For example, the device 104 may determine from an identifier (e.g., a network identifier) of an access point 102 with which the device 104 is associated whether the access point 102 is in the CG. If yes, the device 104 may defer transmissions according to the inner NAV. If not, the device 104 may defer transmissions according to the outer NAV. As another example, the leader access point 102 of the CG may use a frame (e.g., a MAPC advertisement frame) to indicate the access points 102 in the CG. The leader access point 102 may include, in the frame, a bitmap that indicates the access points 102 assigned to the CG. The device 104 may use the bitmap to determine whether the access point 102 with which the device 104 is associated belongs to the CG. The leader access point 102 may update the bitmap as the membership in the CG changes.

In the example of FIG. 1A, the access point 102A is the leader of a CG. The access point 102A communicates dual NAVs 106 (e.g., the inner NAV and the outer NAV) to the other access points 102B and 102C and to the device 104A. The access point 102B may be part of the CG, and so the access point 102B processes the inner NAV. The access point 102C may be outside the CG, and so the access point 102C processes the outer NAV. The access points 102A and 102B may make transmissions 108 and 110 during a time period indicated by the inner NAV. The access point 102C may defer transmissions during a time period indicated by the outer NAV. The time periods indicated by the inner NAV and the outer NAV may share some overlap such that the access point 102C defers transmissions while the access points 102A and 102B make the transmissions 108 and 110.

Figure 1B:
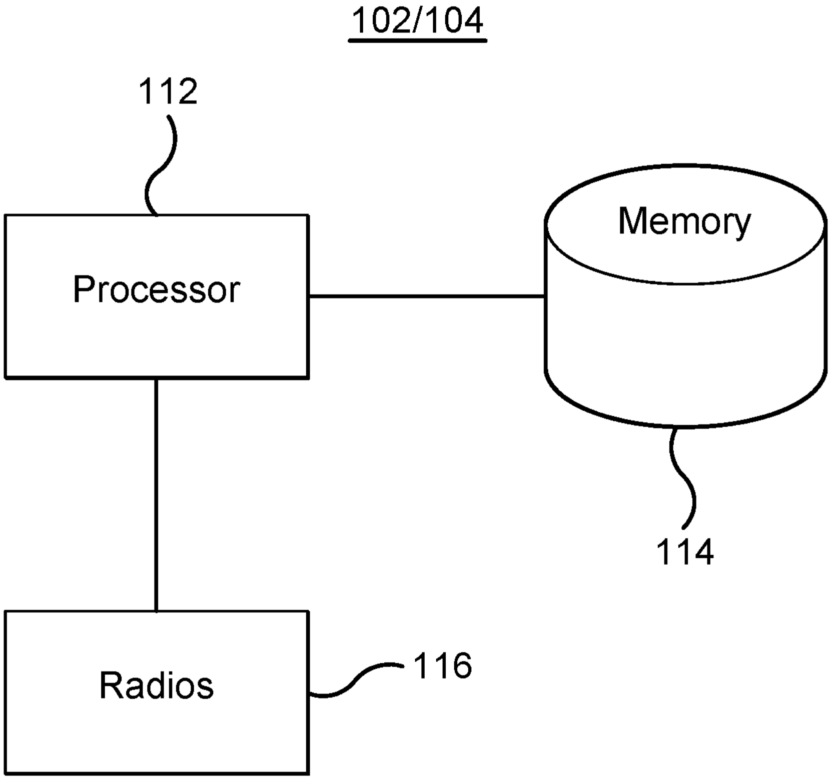

FIG. 1B illustrates an example access point 102 or device 104 in the system 100 of FIG. 1A. As seen in FIG. 1B, the access point 102 or device 104 includes a processor 112, a memory 114, and one or more radios 116.

The processor 112 is any electronic circuitry, including, but not limited to one or a combination of microprocessors, microcontrollers, application specific integrated circuits (ASIC), application specific instruction set processor (ASIP), and/or state machines, that communicatively couples to the memory 114 and controls the operation of the access point 102 and/or device 104. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on the memory 114 to perform any of the functions described herein. The processor 112 controls the operation and administration of the access point 102 and/or device 104 by processing information (e.g., information received from the memory 114 and radios 116). The processor 112 is not limited to a single processing device and may encompass multiple processing devices contained in the same device or computer or distributed across multiple devices or computers. The processor 112 is considered to perform a set of functions or actions if the multiple processing devices collectively perform the set of functions or actions, even if different processing devices perform different functions or actions in the set.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein. The memory 114 is not limited to a single memory and may encompass multiple memories contained in the same device or computer or distributed across multiple devices or computers. The memory 114 is considered to store a set of data, operational software, or information if the multiple memories collectively store the set of data, operational software, or information, even if different memories store different portions of the data, operational software, or information in the set.

The radios 116 may communicate messages or information using different communication technologies. For example, the access point 102 and/or device 104 may use one or more of the radios 116 for WiFi communications. The access point 102 and/or device 104 may use one or more of the radios 116 to transmit messages and one or more of the radios 116 to receive messages. The access point 102 and/or device 104 may include any number of radios 116 to communicate using any number of communication technologies.

Figure 2:
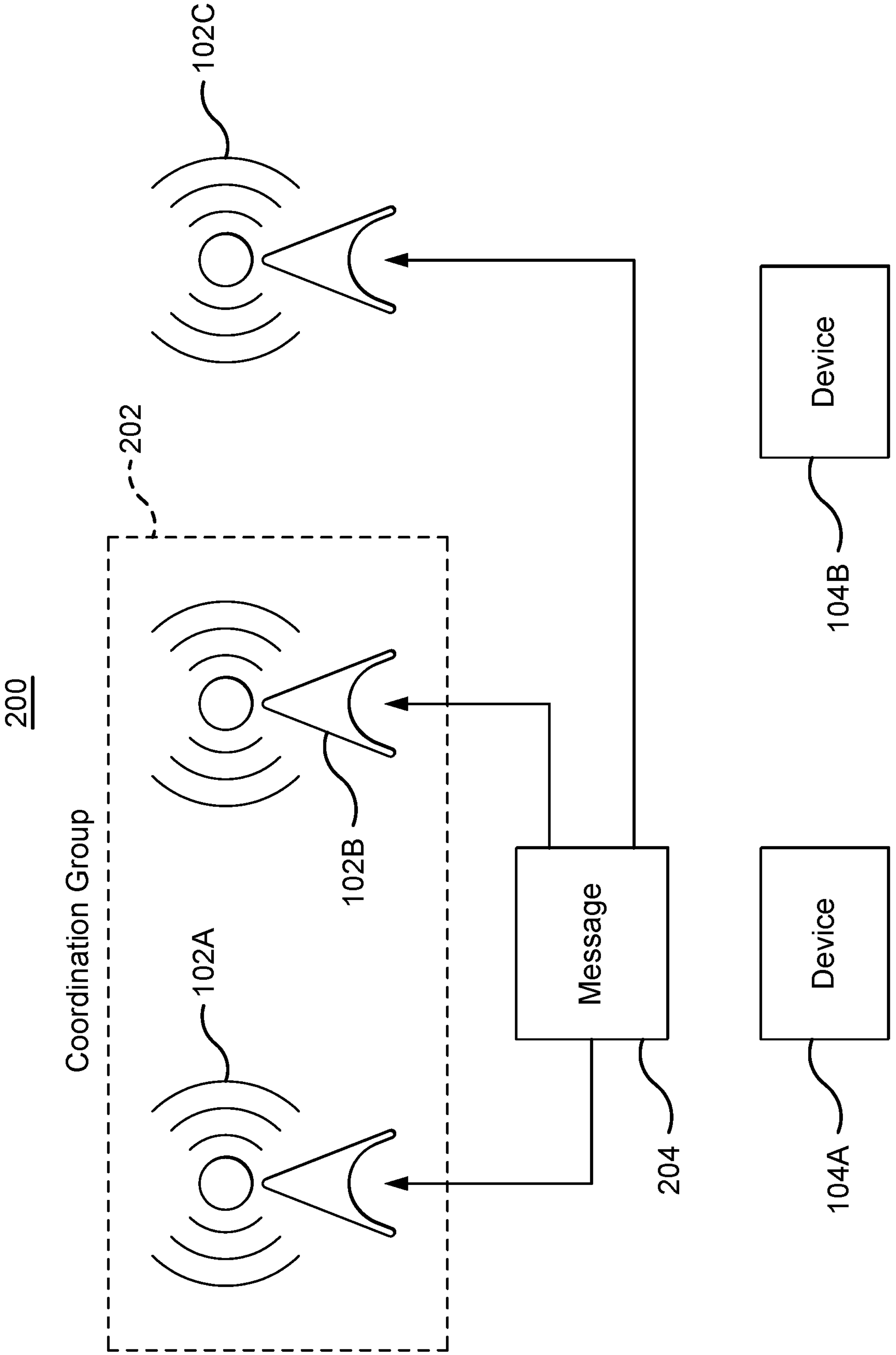
FIG. 2 illustrates an example operation performed by the system of FIG. 1A.

FIG. 2 illustrates an example operation 200 performed by the system 100 of FIG. 1A. As seen in FIG. 2, the access points 102A and 102B are assigned to a CG 202. The access point 102C is outside the CG 202. The access point 102A may be the leader of the CG 202. As a result, the access point 102A may coordinate the transmissions of the access points 102 in the CG 202.

The access point 102A transmits a message 204 to coordinate transmissions in the system 100. The message 204 may be received by any component in the system 100. In the example of FIG. 2, the access points 102B and 102C receive the message 204. The message 204 may include two NAVs, the outer NAV and the inner NAV. As discussed previously, the outer NAV may indicate time periods when access points 102 outside the CG 202 should defer transmissions. The inner NAV may indicate time periods when access points 102 in the CG 202 may transmit. As a result, the access point 102C may process the outer NAV in the message 204 to determine when the access point 102C should defer transmissions. The access point 102B processes the inner NAV in the message 204 to determine when the access point 102B should transmit. In this manner, the access point 102A coordinates and parallelizes the transmissions of the access points 102 in the CG 202, while reducing interference from access point 102 outside the CG 202.

The devices 104A and 104B may associate with any of the access points 102 in the system 100. In the example of FIG. 2, the devices 104A and 104B may associate with one or more of the access points 102A, 102B, and 102C. For example, the device 104A may associate with the access point 102B, and the device 104B may associate with the access point 102C. The devices 104A and 104B may process the inner NAV or the out NAV depending on whether the access points 102 with which the devices 104A and 104B are associated are part of the CG 202 or not.

Figure 3:
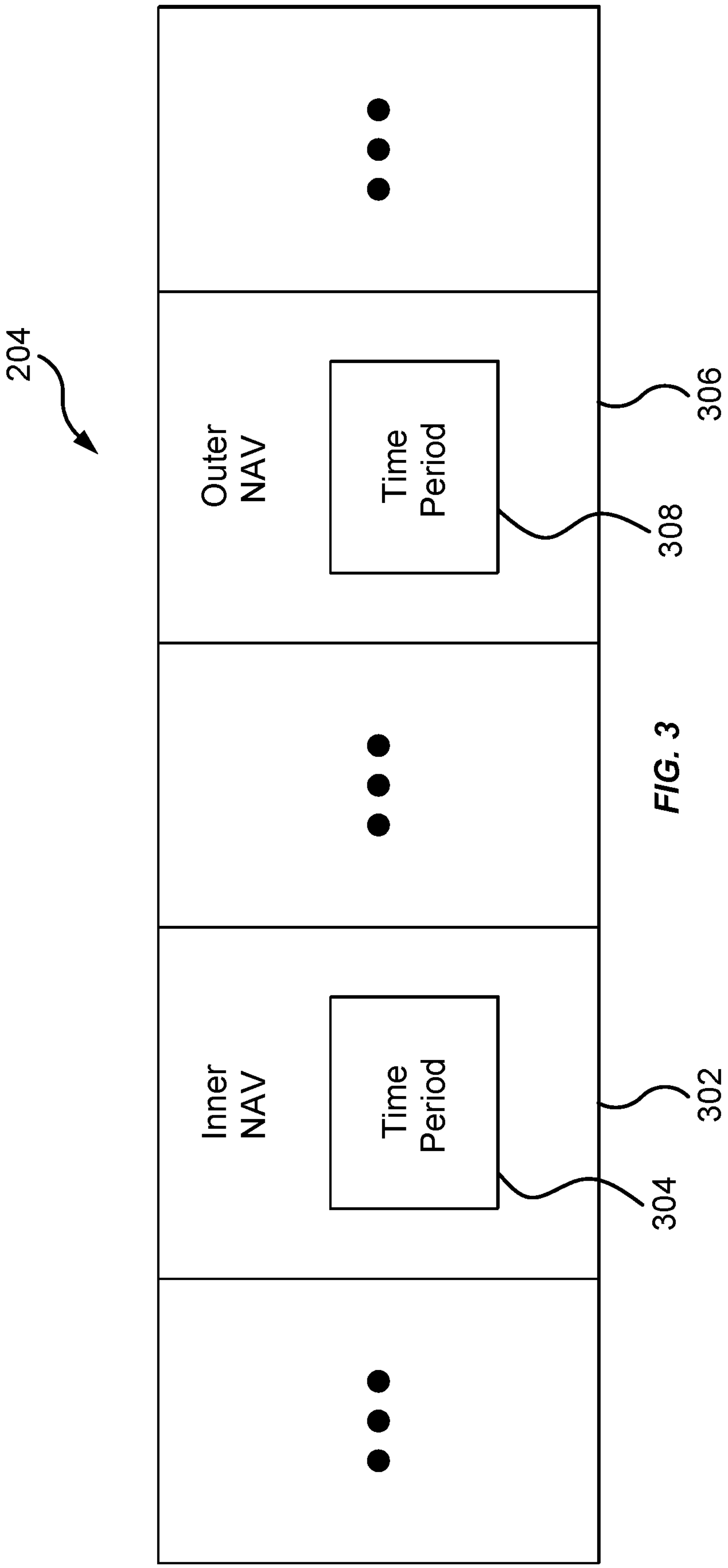
FIG. 3 illustrates an example message in the system of FIG. 1A.

FIG. 3 illustrates an example message 204 in the system 100 of FIG. 1A. As seen in FIG. 3, the message 204 includes an inner NAV 302. The inner NAV 302 may indicate a time period 304. As discussed previously, access points 102 in the CG 202 may process the inner NAV 302 to determine the time period 304 when the access points 102 may transmit. The message 204 also includes an outer NAV 306. The outer NAV 306 indicates a time period 308. As discussed previously, the access points 102 that are outside the CG 202 process the outer NAV 306 to determine the time period 308 when the access points 102 should defer transmissions.

In certain embodiments, the time period 304 and the time period 308 may partially overlap. For example, the time period 304 may be contained in or partially contained in the time period 308. As a result, the access points 102 in the CG 202 may transmit during a time when the access points 102 that are outside the CG 202 are deferring transmissions. As a result, the access points 102 in the CG 202 may parallelize transmissions, while the access points 102 outside the CG 202 defer transmissions to reduce interference.

Figure 4:
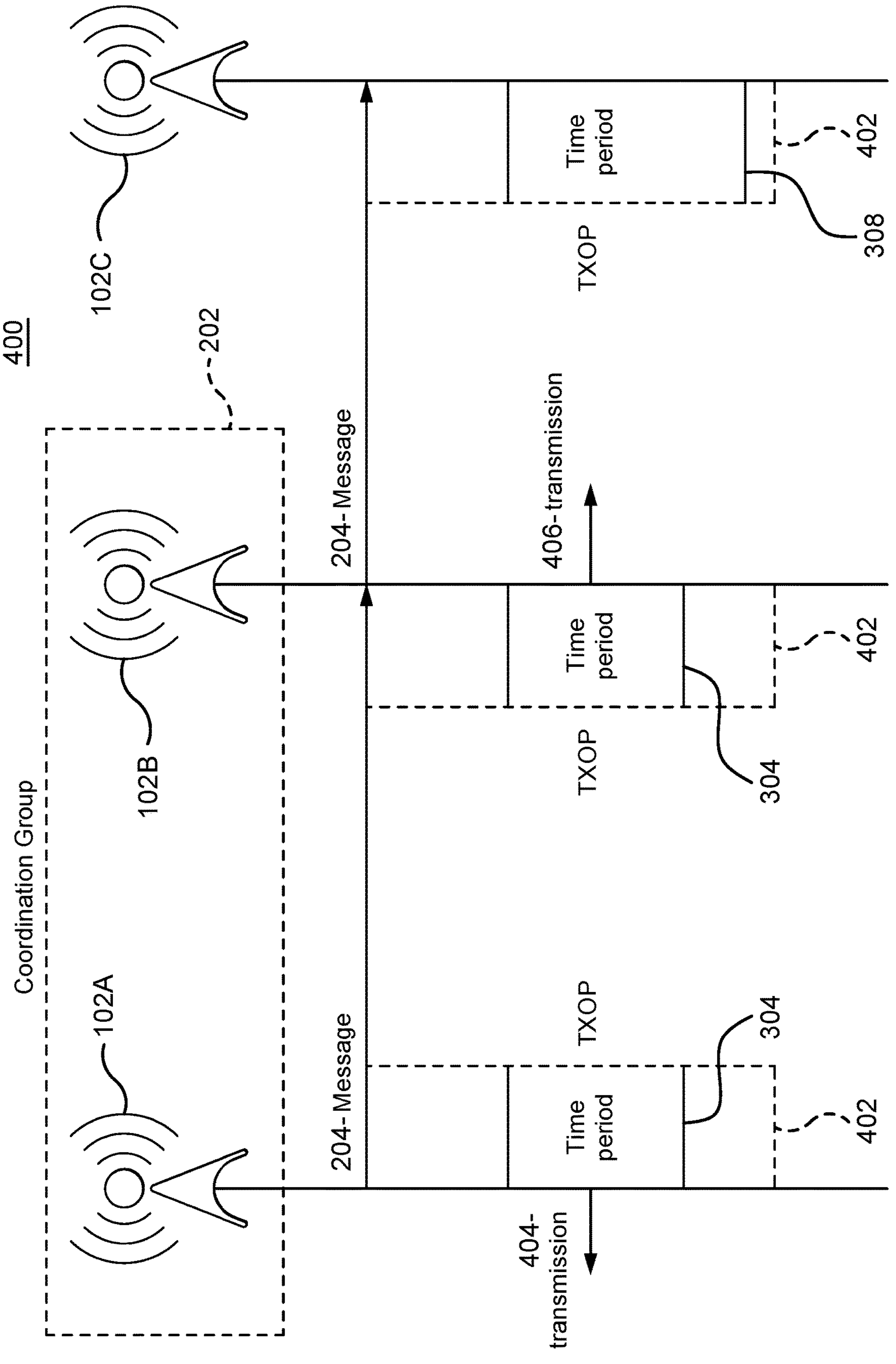
FIG. 4 illustrates an example operation performed by the system of FIG. 1A.

FIG. 4 illustrates an example operation 400 performed by the system 100 of FIG. 1A. As seen in FIG. 4, the access points 102A and 102B are assigned to the CG 202. The access point 102A may be the leader of the CG 202 and may coordinate transmissions. The access point 102C is not assigned to the CG 202.

The access point 102A begins by transmitting the message 204. The access points 102B and 102C may receive the message 204. The access point 102A may transmit the message 204 at the beginning of a TXOP 402. The message 204 includes the inner NAV and the outer NAV that indicate time periods during the TXOP 402 when the access points 102 in the CG 202 should transmit and when the access points 102 outside the CG 202 should defer transmissions. In some embodiments, the access point 102A may determine that an access point 102 in the CG 202 (e.g., the access point 102A or the access point 102B) won contention for the TXOP 402, and thus, the TXOP 402 belongs to the CG 202 (and may be referred to as a MAPC TXOP). In response, the access point 102A may coordinate transmissions so that the access points 102 in the CG 202 may transmit during the TXOP 402 and so that access points 102 outside the CG 202 defer transmissions during the TXOP 402. The access point 102A generates and transmits the message 204 to coordinate transmissions in this manner.

The access point 102B processes the inner NAV in the message 204 to determine that the access point 102B is allowed to make the transmission 406 during the time period

304. The inner NAV indicates the time period 304 during the TXOP 402 when access points 102 assigned to the CG 202 may transmit. As seen in FIG. 4, the time period 304 falls within the TXOP 402. During the time period 304, the access point 102B may schedule transmissions. Additionally, the access point 102A may schedule transmissions during the time period 304. These transmissions may occur in parallel rather than serially. As seen in FIG. 4, the access point 102A makes a transmission 404 during the time period 304, and the access point 102B makes a transmission 406 during the time period 304. The transmission 404 and the transmission 406 may occur at the same time or at different times during the time period 304.

The access point 102C processes the outer NAV in the message 204, because the access point 102C is outside the CG 202. The access point 102 processes the outer NAV to determine the time period 308 when the access point 102C should defer transmissions. As seen in FIG. 4, the time period 308 falls within the TXOP 402. Additionally, the time period 308 may partially overlap the time period 304. For example, the time period 304 may fall within the time period 308. The access point 102C may defer transmissions during the time period 308. As a result, the access point 102C may defer transmissions when the access points 102A and 102B are transmitting during the time period 304, which reduces interference.

Figure 5:
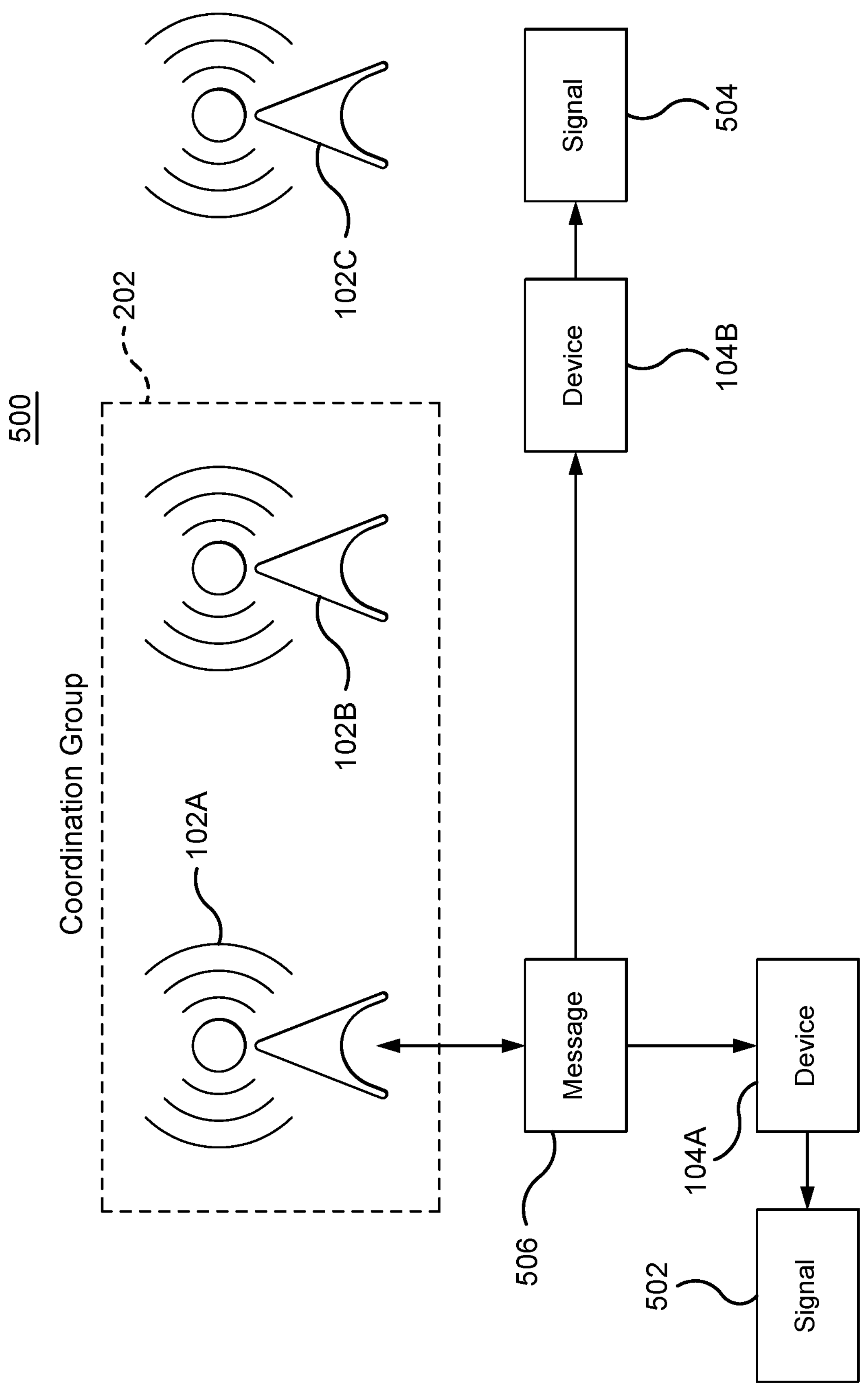
FIG. 5 illustrates an example operation performed by the system of FIG. 1A.

FIG. 5 illustrates an example operation 500 performed by the system 100 of FIG. 1A. As seen in FIG. 5, the device 104A may be associated with the access point 102A, and the device 104B may be associated with the access point 102C. The access point 102A and the access point 102B are assigned to the CG 202. The access point 102C is outside the CG 202.

The devices 104A and 104B may signal whether the device 104A or the device 104B supports dual NAVs. Specifically, the device 104A and the device 104B may signal whether the device 104A and device 104B understand how to process different NAVs depending on whether the access points 102 with which the device 104A and the device 104B are associated belong to the CG 202 or not. In the example of FIG. 5, the device 104A communicates a signal 502 indicating that the device 104A supports dual NAVs. The device 104B communicates a signal 504 indicating that the device 104B supports dual NAVs. In some embodiments, the signal 502 and/or the signal 504 are a subfield (e.g., a dual NAV mode subfield) in an element (e.g., an Extended Capabilities element).

When the access point 102A determines from the signals 502 and 504 that the devices 104A and 104B support dual NAVs, the access point 102A may generate and communicate a message 506 that is received by the devices 104A and 104B. In some embodiments, the message 506 is the same as the message 204 shown in FIG. 2 that is received by the access points 102B and 102C. The message 506 may include the inner NAV and the outer NAV.

The devices 104A and 104B may process the inner NAV or the outer NAV depending on whether the devices 104A and 104B are associated with access points 102 in the CG 202 or outside the CG 202. In the example of FIG. 5, because the device 104A is associated with the access point 102A in the CG 202, the device 104A may process the inner NAV in the message 506 to determine when the device 104A should defer transmissions. Because the device 104B is associated with the access point 102C outside the CG 202, the device 104B may process the outer NAV in the message 506 to determine when the device 104B should defer transmissions. The device 104A may then defer transmissions during the time period indicated in the inner NAV, and the device 104B may defer transmissions during the time period indicated in the outer NAV. In this manner, the devices 104A and 104B defer transmissions when the access points 102A and 102B and the CG 202 are transmitting, which reduces interference.

Figure 6:
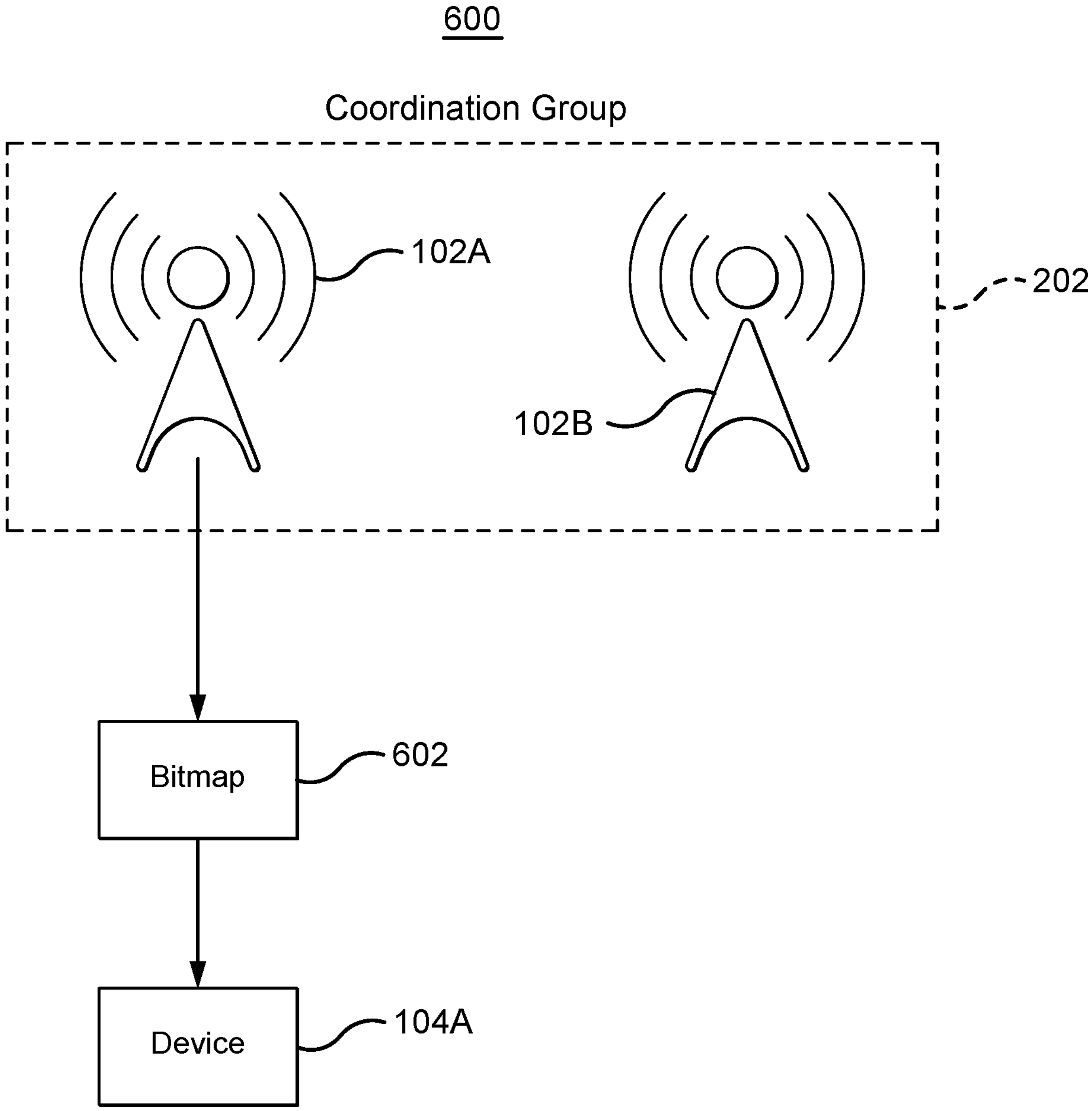
FIG. 6 illustrates an example operation performed by the system of FIG. 1A.

FIG. 6 illustrates an example operation 600 performed by the system 100 of FIG. 1A. As see in FIG. 6, the access points 102A and 102B are assigned to the CG 202. The device 104A may be associated with the access point 102A. The access point 102A communicates a bitmap 602 to the device 104A. The bitmap 602 may indicate the access points 102 that are assigned to the CG 202. In the example of FIG. 6, the bitmap 602 may indicate the access points 102A and 102B. The device 104A may analyze the bitmap 602 to understand which access points 102 are assigned to the CG 202. If the device 104A then determines that the device 104A is associated with an access point 102 that is assigned to the CG 202, the device 104A may understand that the device 104A should process the inner NAV to determine when to defer transmissions. If the device 104A determines from the bitmap 602 that the device 104A is associated with an access point 102 that is outside the CG 202, then the device 104A may process the outer NAV to determine when to defer transmissions.

Figure 7:
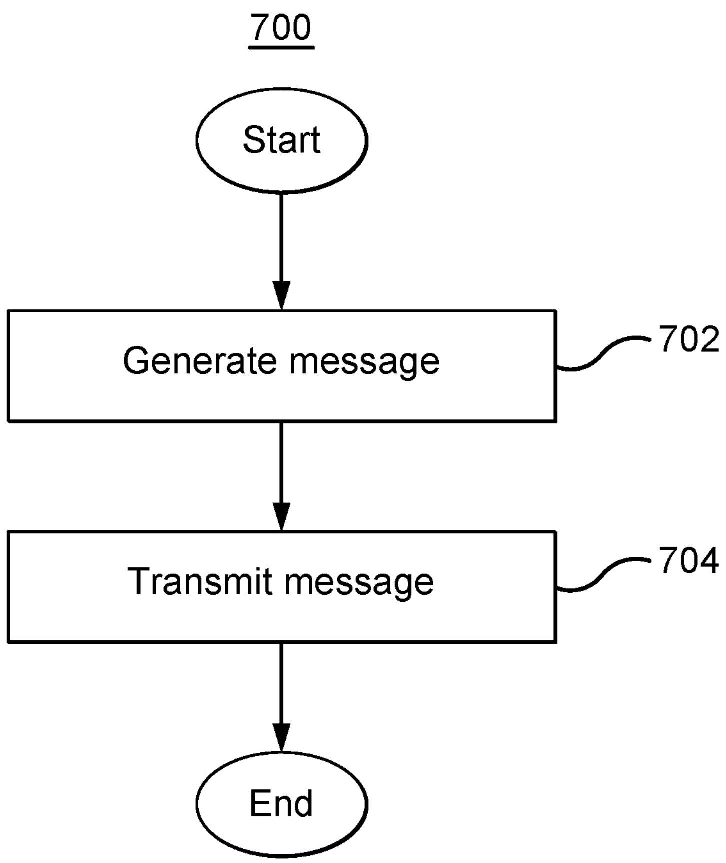
FIG. 7 is a flowchart of an example method performed by the system of FIG. 1A.

In some embodiments, the device 104A may use an identifier (e.g., a network identifier) of the access point 102 with which the device 104A is associated to determine whether the access point 102 is assigned to the CG 202 or not. For example, FIG. 7 is a flowchart of an example method 700 performed by the system 100 of FIG. 1A. In particular embodiments, the access point 102A performs the method 700. By performing the method 700, the access point 102A coordinates transmissions of the access points 102 in the CG 202 and the access points 102 outside the CG 202.

In block 702, the access point 102A generates a message 204. The message 204 may include an inner NAV 302 and an outer NAV 306. The inner NAV 302 indicates a time period 304 when access points 102 in the CG 202 are allowed to transmit. The outer NAV 306 indicates a time period 308 when access points 102 outside the CG 202 should defer transmissions. The time period 304 and the time period 308 may partially overlap. As a result, the access points 102 in the CG 202 are allowed to transmit when the access points 102 outside the CG 202 defer transmissions.

In block 704, the access point 102 transmits the message 204. Other access points 102 in the system 100 may receive the message 204. Some of the access points 102 may belong to the CG 202, and some of the access points 102 may be outside the CG 202. The access points 102 in the CG 202 may process the inner NAV 302 in the message 204 to determine the time period 304 when the access points 102 are allowed to transmit. The access points 102 outside the CG 202 process the outer NAV 306 to determine the time period 308 when the access points 102 should defer transmissions. In this manner, interference may be reduced when the access points 102 and the CG 202 are transmitting. Additionally, the NAVs may be used to coordinate and parallelize the transmissions of the access points 102 in the CG 202.

In summary, a network (e.g., a WiFi network) uses dual NAVs to coordinate transmissions from access points 102 that are assigned to a CG 202 and from access points 102 that are outside the CG 202 (e.g., access points 102 that are part of an overlapping basic service set (OBSS)). An access point 102 in the CG 202 (e.g., a leader access point 102) may transmit a message 204 (e.g., a CG setup frame) that includes two NAVs, referred to as an outer NAV and an inner NAV. The outer NAV indicates to access points 102 in an OBSS a time period when transmissions should be deferred (similar operation to existing NAVs). The inner NAV indicates to access points 102 in the CG 202 a time period when transmissions are allowed. The time period when the access points 102 in the OBSS defer transmissions may partially overlap with the time period when the access points 102 in the CG 202 are allowed to transmit. In this manner, the access points 102 in the CG 202 may parallelize transmissions during a TXOP for the CG 202, while the access points 102 in the OBSS defer transmissions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:

one or more memories; and one or more processors communicatively coupled to the memory, a combination of the one or more processors configured to:

generate a message comprising (i) a first network allocation vector (NAV) indicating a first time period and (ii) a second NAV indicating a second time period;

transmit the message, wherein the first NAV indicates to a first access point assigned to an overlapping basic service set to defer transmissions during the first time period, and wherein the second NAV indicates to a second access point assigned to a multi-access point coordination (MAPC) group that transmissions are allowed during the second time period; and transmit a bitmap indicating the second access point as being part of the MAPC group.

2. The apparatus of claim 1, wherein the apparatus is assigned to the MAPC group.

3. The apparatus of claim 1, wherein the apparatus is a leader of the MAPC group.

4. The apparatus of claim 1, wherein the message is transmitted at a start of a MAPC transmission opportunity (TXOP).

5. The apparatus of claim 4, wherein the first time period occurs during the MAPC TXOP.

6. The apparatus of claim 1, wherein generating the message is based on a signal, from a device associated with the second access point, indicating that the device supports dual NAVs.

7. The apparatus of claim 1, wherein the first time period and the second time period at least partially overlap.

8. A method comprising:

generating, by a first access point, a message comprising (i) a first network allocation vector (NAV) indicating a first time period and (ii) a second NAV indicating a second time period;

transmitting, by the first access point, the message, wherein the first NAV indicates to a second access point assigned to an overlapping basic service set to defer transmissions during the first time period, and wherein the second NAV indicates to a third access point assigned to a multi-access point coordination (MAPC) group that transmissions are allowed during the second time period; and transmitting, by the first access point, a bitmap indicating the third access point as being part of the MAPC group.

9. The method of claim 8, wherein generating the message is based on a signal, from a device associated with the third access point, indicating that the device supports dual NAVs.

10. The method of claim 8, wherein the first access point is assigned to the MAPC group.

11. The method of claim 8, wherein the first access point is a leader of the MAPC group.

12. The method of claim 8, wherein the message is transmitted at a start of a MAPC TXOP.

13. The method of claim 12, wherein the first time period occurs during the MAPC TXOP.

14. A system comprising:

a first access point assigned to a multi-access point coordination (MAPC) group; and a second access point assigned to the MAPC group and configured to:

generate a message comprising (i) a first network allocation vector (NAV) indicating a first time period and (ii) a second NAV indicating a second time period;

transmit the message, wherein the first NAV indicates to access points assigned to an overlapping basic service set to defer transmissions during the first time period, and wherein the second NAV indicates to the first access point that transmissions are allowed during the second time period; and transmit a bitmap indicating the first access point as being part of the MAPC group.

15. The system of claim 14, wherein the message is transmitted at a start of a MAPC TXOP.

16. The system of claim 15, wherein the first time period occurs during the MAPC TXOP.

17. The system of claim 14, wherein the second access point is a leader of the MAPC group.

18. The system of claim 14, wherein generating the message is based on a signal, from a device associated with the first access point, indicating that the device supports dual NAVs.

* * * * *